J. C. FRENCH.
Wheel-Cultivator.
No. 59,381.
Patented Nov. 6, 1866.
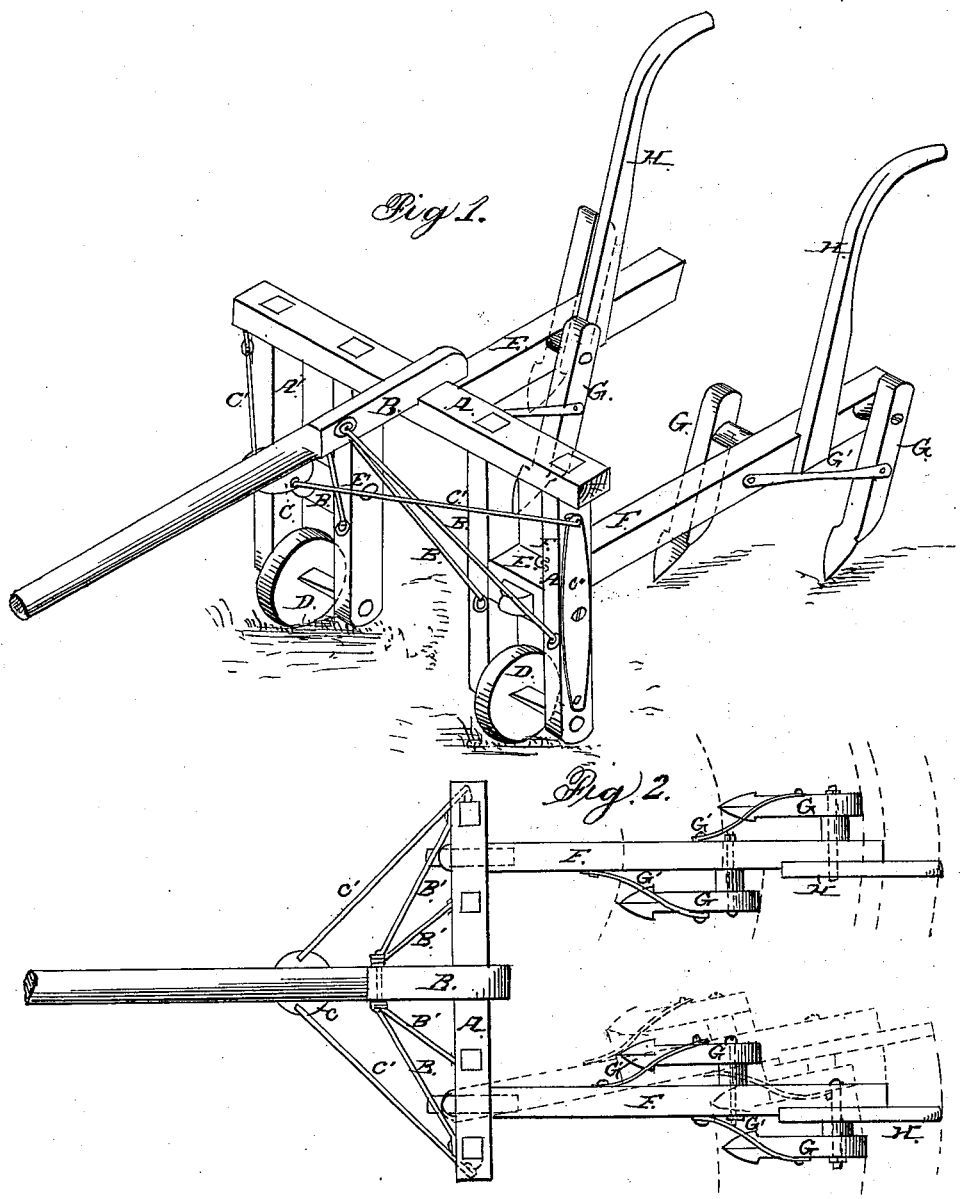
WITNESSES:
INVENTOR:
James C. French

UNITED STATES PATENT OFFICE.

JAMES C. FRENCH, OF MONMOUTH, ILLINOIS.

IMPROVEMENT IN CULTIVATORS.

Specification forming part of Letters Patent No. 59,381, dated November 6, 1866.

*To all whom it may concern:*

Be it known that I, JAMES C. FRENCH, of Monmouth, in the county of Warren and State of Illinois, have invented a new and useful Improvement in Cultivators; and I do hereby declare that the following is a full, clear, and exact description of the same, reference being had to the annexed drawings, making a part of this specification, in which—

Figure 1 is a perspective view, and Fig. 2 is a plan.

In the figures the same letters are employed in indicating identical parts.

A is the top piece of the frame, to which is attached the tongue B, secured by braces B', attached to the supporting-pieces A', of which latter there are two at each end of the frame A. In the interval between these pieces A' the wheels D are placed, the axles of which are journaled in the pieces A'. These wheels support the frame, the cross-piece A of which is sufficiently elevated to permit it to pass over the row of corn to be cultivated.

The circular plate C is pivoted centrally to the tongue, and the rods C' extend from it to the bars C'', which are placed on each side of the frame-pieces A, to which they are pivoted in the center. The whiffletrees are hooked to the lower ends of the bars C'', and as they oscillate forward and backward, turning the plate C, the draft is equalized.

E E are swivels, the axes of which are journaled in the side pieces, A', of the frame in such manner as to permit the swivels to turn freely vertically. A slot is formed in the swivels E, to receive the end of the drag-bars F, which are fastened by king-bolts, and so proportioned as to give a free lateral oscillation to the drag-bars, while the revolution of the swivels on their axes gives vertical play to the same. Shovel-plows on the standards G are attached on each side of each of the drag-bars in such manner as to plow on both sides of the central rows of corn and on one side of each of the adjoining rows. The braces G' support the strain on the standards.

H H are handles attached to each drag-bar, by means of which the plowman regulates the action of the plows.

What I claim as my invention, and desire to secure by Letters Patent, is—

1. The combination of the frame-pieces A A', swivels E E, and drag-bars F F, the said parts being respectively constructed, and the whole arranged for use, substantially as set forth.

2. The combination and arrangement of the tongue B, frame A A', plate C, rods C', and bars C'', substantially as described.

In testimony whereof I have signed my name to this specification in the presence of two subscribing witnesses.

JAMES C. FRENCH.

Witnesses:
A. N. REECE,
ALMON KIDDER.